Figure 1:
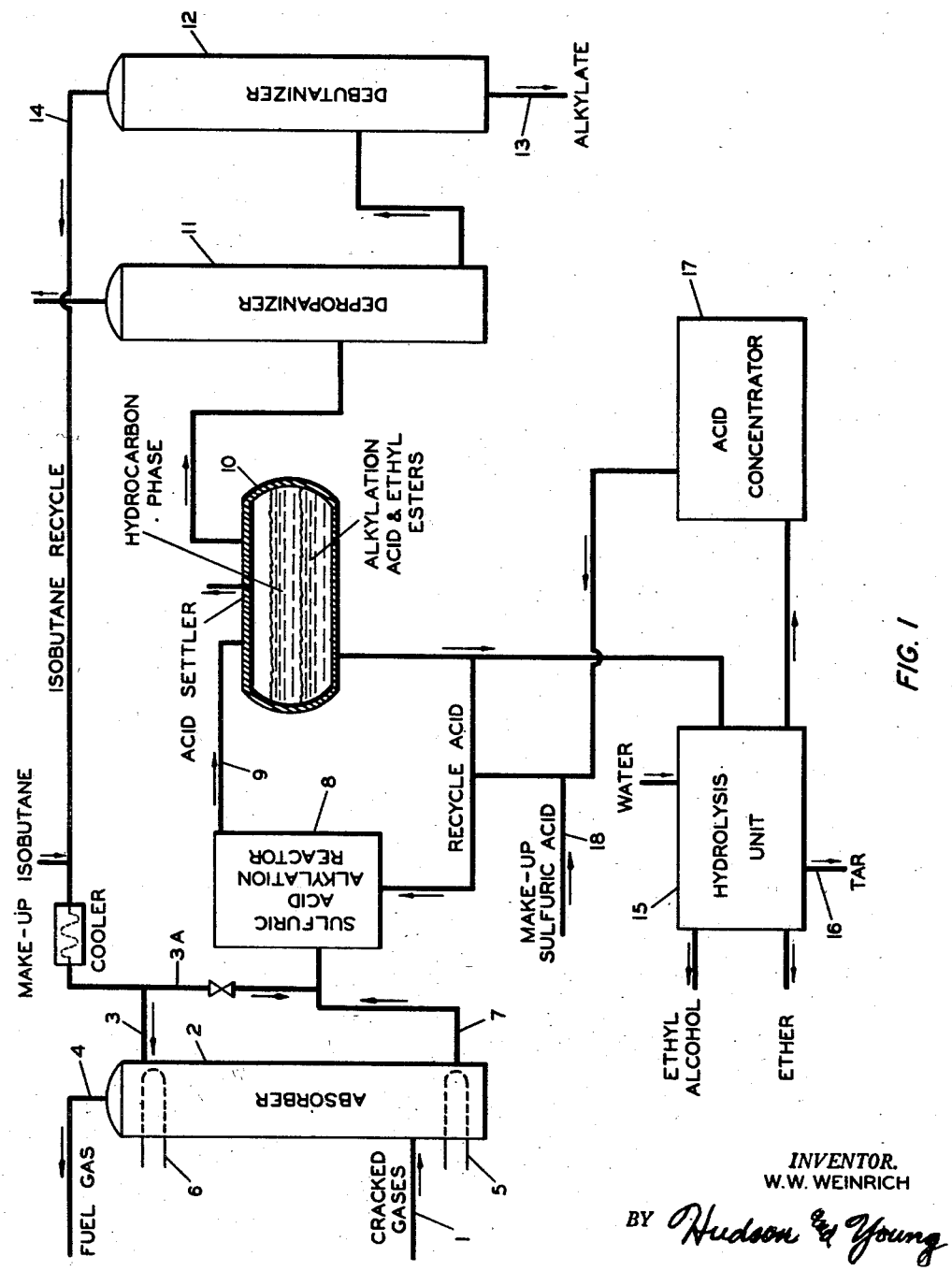

FIG. I

INVENTOR.
W. W. WEINRICH
BY Hudson & Young
ATTORNEYS

INVENTOR.
W. W. WEINRICH
BY Hudson & Young
ATTORNEYS

Patented June 13, 1950

2,511,758

UNITED STATES PATENT OFFICE 2,511,758

PRODUCTION OF ETHYL ALCOHOL AND ALKYLATE

William Whitney Weinrich, Bartlesville, Okla., assignor to Phillips Petroleum Company, a corporation of Delaware Application September 17, 1945, Serial No. 616,931

17 Claims. (Cl. 260—639)

This invention relates to a process for the production of ethyl alcohol and alkylate, i. e., branched chain paraffins having seven or more carbon atoms per molecule, from gases containing ethylene and higher aliphatic olefins such as propylene, butylenes and possibly amylenes, and an isoparaffin especially isobutane. Such gases are obtained by cracking processes, either as the gas produced as by-product in the cracking of normally liquid feeds such as crude oil, gas oil, etc., or as the principal product in the cracking of ethane, propane, butane or mixtures of two or more thereof.

The production of ethyl alcohol by the hydration of ethylene in the presence of sulfuric acid is old in the art. However, the principal problem connected with this method of ethanol synthesis has been a source of ethylene of adequate purity and of low cost. It is well known that ethylene is produced in large quantities as a by-product from the cracking of petroleum distillates. It is also known that ethylene produced in this way or by cracking operations directed specifically to the production of ethylene, is invariably contaminated with other olefins such as propylene and the various butylenes. The employment of such impure gas streams in hydration reactions results in a product contaminated with isopropyl and butyl alcohols which presents an extremely difficult purification problem. In the past it has been found that purification of the ethylene feed is preferable to purification of the final product. Conventionally, selected cracked gases have been stripped of all component heavier than ethane by contact with an absorption agent such as mineral seal oil prior to the hydration operation. The absorption system required to accomplish this separation is expensive both as to investment and operation thus greatly increasing the cost of synthetic ethanol from this source.

The principal object of the present invention is to provide an improved process for the production of ethyl alcohol from gas containing ethylene and at least one higher olefin, especially cracked petroleum gases. Another object is to selectively convert the ethylene contained in cracked petroleum gases to ethyl alcohol of high purity. Another object is to provide a unitary combination process operating on refinery cracked gases and producing therefrom as primary products ethyl alcohol and alkylate gasoline. Another object is to provide a process of the foregoing type which operates in a simple and economical manner and requires a minimum of equipment. Another object is to accomplish the conversion of ethylene in cracked petroleum gases to ethyl alcohol concomitantly with conversion of propylene and higher olefins contained therein to valuable alkylate, with a minimum of change in and addition of equipment to the usual alkylation plant. Another object is to provide a process of the foregoing type wherein the expense and inconvenience of the conventional removal of propylene and higher olefins in the manufacture of ethyl alcohol from ethylene-containing gases are eliminated in a peculiarly advantageous manner. Another object is to provide a process of the foregoing type which utilizes the same material as alkylation catalyst and as ethylene esterification and hydration agent. Another object is to provide for the utilization of the isoparaffin both as the hydrocarbon alkylated with propylene and higher olefins and as the absorption liquid for the separation of the olefins from the cracked petroleum gases. Another object is to provide a process as in the foregoing which utilizes hydrofluoric acid and which provides a novel and simple recovery system for recovering the ethyl alcohol and the alkylate from the alkylation effluent. Numerous other objects of the present invention will be apparent to those skilled in the art from a consideration of the following description.

Figure 2:
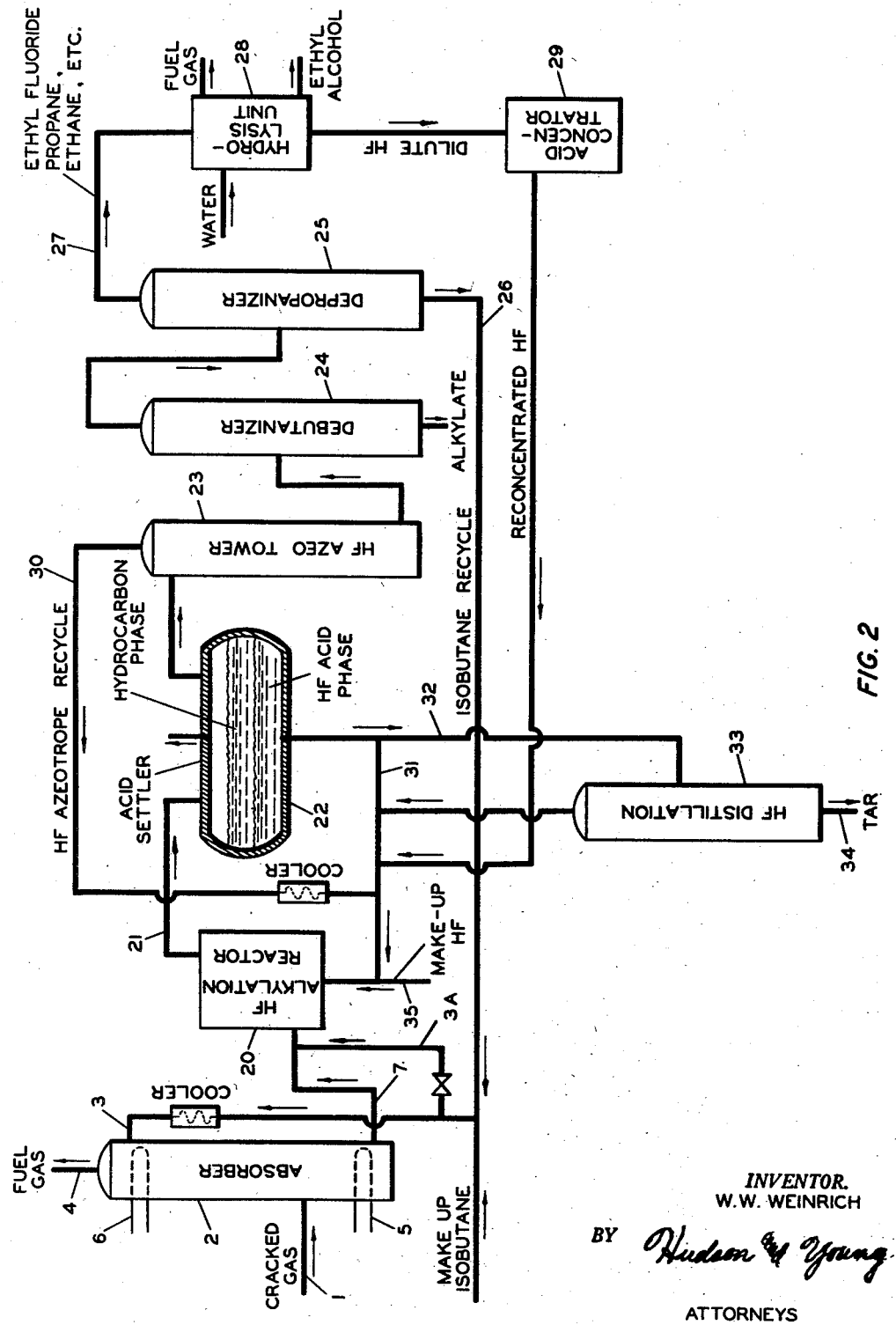

In the accompanying drawings, Fig. 1 portrays diagrammatically one arrangement of equipment which may be employed in carrying out the present invention using sulfuric acid or equivalent acid as the alkylation catalyst and as the ethylene conversion medium. Fig. 2 similarly portrays an arrangement where hydrofluoric acid is used as the alkylating catalyst and ethylene hydration agent.

I have now found that cracked petroleum gases containing ethylene can be economically converted to ethyl alcohol with a minimum of pretreatment by appropriate combination of gas absorption with catalytic alkylation systems whereby ethylene is selectively separated from contaminating olefins and converted to ethanol through the agency of the alkylation catalyst.

More specifically, it is now proposed to absorb the ethylene-containing gases in an alkylatable isoparaffinic hydrocarbon and to feed the resulting solution to an alkylation system employing an acidic catalyst active toward the alkylation of propylene and higher olefins, but substantially inactive with respect to ethylene-isoparaffin systems. Olefin impurities are thus converted to useful alkylate gasoline while the ethylene is caused to react with the acid catalyst yielding ethyl esters. The ethyl ester or esters are suitably hydrolyzed to yield the desired ethyl alcohol substantially free of higher homologs. Suitable acid catalysts for the operation of this invention are sulfuric and hydrofluoric acids.

Feeds

The hydrocarbon feeds to the process of the present invention are the olefin-containing gas and the isoparaffin which is fed in liquid form to the top of the absorber. The olefin-containing gas may be any gas which contains ethylene and at least one higher olefin such as propylene, butylenes, or amylenes, together with at least one gaseous component lighter than $C_2$ such as methane or hydrogen or, more usually, both. Generally, it also comprises the paraffins corresponding to the olefins present. The isoparaffin is generally isobutane although it may be isopentane or even isohexane or a mixture of several isoparaffins. In many cases it will be substantially free from normal paraffins. Both feeds should preferably be substantially free from sulfur and sulfur compounds including hydrogen sulfide and mercaptans, and from compounds of nitrogen and oxygen, since such materials tend to interfere with the alkylation step, consume the alkylation acid, and/or result in objectionable components in the desired products.

Absorption step

The absorption step may be conducted as a simple gas scrubbing operation, the cracked petroleum gas being introduced near the bottom of the absorber and being scrubbed countercurrently with the liquid isoparaffin which is introduced at the top of the column. The isoparaffin should be at such a temperature and introduced in such volume as to keep the top temperature of the absorber suitably low to prevent substantial loss of isoparaffin in the off-gas. I prefer to reboil the bottoms product before it is withdrawn in order to prevent gases lighter than $C_2$ from being dissolved therein. In some cases it may be preferred to partially condense the overhead gases in order to liquefy substantially all of the $C_4$ and heavier or substantially all of the $C_3$ and heavier and in extreme cases even most or substantially all of the $C_2$ and heavier and reflux the top of the absorber with the resulting liquid condensate. Where the absorption is thus conducted substantially as an "extractive distillation," the cracked gas feed is introduced at a point near or at the middle of the absorber, the upper half of the column functioning as a rectification section and the lower as a stripping section.

The absorption step will usually be conducted at pressures of the order of 600 to 1000 pounds per square inch gauge in order that ordinary cooling water will be adequate for cooling the incoming isoparaffin and the top of the column. However, pressures as low as 300 pounds may be used in exceptional cases where loss of $C_2$ and heavier in the residue gas is not objectionable or is prevented by the use of a closed refrigeration cycle. Usually the temperature in the top of the absorber will be from 100 to 130° F. which can be obtained with ordinary cooling water. The temperature in the bottom of the absorber may range from 100° F. where no reboiling is used up to 250° F. where the bottoms product is reboiled. The temperatures given are for absorption pressures of 600 to 1000 pounds.

It is preferred to so operate the absorber that substantially all the $C_2$ and heavier but substantially no material lighter than $C_2$ is dissolved in the withdrawn liquid isoparaffin. Since the isoparaffin is not selective as between olefins and paraffins but operates substantially solely on the basis of volatility, the $C_2$ and heavier paraffins from the feed are also dissolved in the withdrawn absorber bottoms product. However, they function merely as an inert diluent in the alkylation step and are removed in the subsequent depropanization operation applied to the hydrocarbon phase contained in the alkylation effluent and so are unobjectionable so long as they are not present in so great a quantity as to unduly slow up the alkylation.

In general, it is preferred to feed isoparaffin into the top of the absorption zone at such a rate relative to the introduction of olefin-containing gas as to maintain an isoparaffin-olefin molar ratio in the feed to the alkylation zone of at least 5:1 whereby absorption is facilitated and side reactions in the alkylation zone are minimized. The ratio may run as high as 10:1 or even higher. Since the excess isoparaffin appears in the alkylation effluent and is recovered therefrom and recycled to the top of the absorber, it is thus possible to maintain an artificially high ratio of isoparaffin to olefin in the alkylation zone in a very simple and efficacious manner.

The withdrawn solution of olefins and isoparaffin is passed to the alkylation step.

Alkylation step

The alkylation step of my invention is so conducted as to accomplish two results concomitantly, namely, (1) the alkylation of the isoparaffin, generally isobutane, with substantially all of the propylene and any higher olefin present to form alkylate, i. e., branched chain paraffins having seven and more carbon atoms per molecule, and (2) reaction of a major proportion or substantially all of the ethylene with the alkylation acid catalyst, generally, either sulfuric acid or hydrofluoric acid, to give the ethyl ester thereof. In the case of sulfuric acid, either ethyl acid sulfate or diethyl sulfate or both will be formed depending upon the particular circumstances and conditions. Where hydrofluoric acid is used as the alkylation catalyst, the ethylene is converted to ethyl fluoride.

It is preferred to employ such conditions in the alkylating zone that substantially no ester of propylene and higher olefin appears in the alkylation effluent and substantially no ethylene is caused to alkylate the isoparaffin. It is further preferred that the indicated reactions (1) and (2) take place to the substantial exclusion of other reactions especially such undesirable side reactions as polymerization, formation of heavy or tarry material, etc.

Alkylation conditions are so selected that the above results are accomplished. Selection of suitable conditions for effecting these results will be within the skill of the art in the light of this specification. For example, the concentration of the higher aliphatic olefin should be such that it will alkylate the isoparaffin preferentially in respect of the ethylene. Optimum conditions will depend upon many factors such as composition of feed, rates of feed, individual preferences of operators, etc. Operating conditions for a particular situation may be determined by means of laboratory experiments, pilot plant runs, or by actual large scale plant operation.

As the alkylation catalyst I prefer to employ either sulfuric acid or hydrofluoric acid, although under exceptional circumstances other acid alkylation catalysts may be used, such as phosphoric acid, chlorosulfonic acid, fluosulfonic acid, etc., which with ethylene are capable of forming ethyl esters under conditions in which they are capable of effecting alkylation of isoparaffins with propylene and higher aliphatic olefins. Hydrofluoric is preferable to sulfuric in many cases because its use is attended with less undesired side reactions.

The temperature at which the alkylation is conducted should be sufficiently high to effect reaction of the major portion, and preferably substantially all of, the ethylene present with the alkylating acid to give the ethyl ester thereof. For this reason it will ordinarily be somewhat above the temperature conventionally used in alkylation of a given isoparaffin with olefins of higher molecular weight than ethylene using the same acid catalyst. However, it should not be so high that undesirable side reactions take place to an objectionable extent. Usually a temperature of at least 120° F. will be employed. Temperatures thereabove ranging up to 300° F. may be employed. A temperature of at least 180° F. is often preferred. The temperature used may depend upon the acid catalyst employed. For example, when concentrated sulfuric acid (90% or stronger) is used the temperature is preferably at least 120° F. whereas when substantially anhydrous hydrofluoric acid (containing not over about 5% by weight of water) the preferred minimum temperature is 180° F. Higher maximum temperatures may be employed when hydrofluoric acid is used as the catalyst than when sulfuric acid is employed, without deleterious side reactions such as charring, excessive tar formation, etc.

The strength of the acid catalyst may vary widely but I prefer to use at least 90% sulfuric acid and at least 95% hydrofluoric acid.

The pressure at which the alkylation is conducted may vary widely but should be at least sufficient to maintain all of the ingredients present in liquid phase. This aids in effecting the conversion of the ethylene to the ethyl ester. It is preferred that the pressure in the alkylation zone be at least 250 pounds per square inch gauge. The pressure may range up to several thousand pounds. Pressures of at least 250 pounds aid still further in the conversion of the ethylene to the ethyl ester of the acid, usually mono-ethyl and/or di-ethyl sulfate or ethyl fluoride. Pressures of at least 500 pounds are even more effective.

The contact time in the alkylation zone may vary over wide limits, depending upon composition and proportions of reactants, concentration of acid, ratio of isoparaffin to olefin, and other factors. Usually the contact time will fall within the range of from 3 to 60 minutes.

The alkylation is carried out in any suitable type of reactor which effects the desired intimacy of contact. It is ordinarily preferred to use a reactor of the type known as a contactor such as a "Stratco contactor" which accomplishes the desired rapid and intimate mixture and enables close control of temperature of the reactants.

Treatment of alkylation effluent

The alkylation effluent, which is ordinarily an emulsion of acid and hydrocarbon phases, is passed to the usual type of settler wherein it is allowed to separate by gravity into two phases, namely, a lower acid phase and an upper hydrocarbon phase. The hydrocarbon phase contains substantially all of the alkylate. The bulk of the ethyl ester of the alkylating acid may appear in the acid phase or in the hydrocarbon phase.

Where sulfuric acid is used the ethyl esters thereof appear predominantly in the acid phase and are recovered therefrom as ethyl alcohol by hydrolysis with water. Usually a portion of the sulfuric acid phase is recycled directly to the alkylation zone while another portion is passed to the hydrolysis step.

Where hydrofluoric acid is employed the ethyl fluoride appears chiefly in the hydrocarbon layer once the hydrofluoric acid catalyst becomes saturated with this compound. It has been found from experimental work that ethyl fluoride is considerably more soluble in hydrofluoric acid than in hydrocarbons. However, once the acid becomes saturated the ethyl fluoride in excess of the amount required for saturation appears in the hydrocarbon phase. In such case the acid layer is recycled to the alkylation zone, a portion thereof being rerun in known manner as necessary to maintain the acid at a suitably high level of activity. The hydrocarbon layer is preferably treated in the following manner: It is first fractionally distilled to recover overhead an azeotrope of hydrogen fluoride and hydrocarbons which may be recycled directly to the alkylation zone or liquid layer phase separation may be permitted to occur and the acid phase recycled to the feed to the column. Frequently, the hydrocarbon in the overhead product will consist largely of the isoparaffin introduced to the alkylation unit as feed stock. In this case the total overhead product is preferably recycled to the alkylation zone. The bottoms product is then fractionally distilled in a second column to recover the alkylate as bottoms. This column is usually operated so that the alkylate product will include the hydrocarbons higher boiling than the isoparaffin feed stock. The overhead from the last-named column is then fractionally distilled in a third column, which almost invariably performs a depropanizing operation giving an isoparaffin bottoms product which is recycled in liquid form to the top of the absorption step; or, if desired, a part of the isoparaffin bottoms product may be recycled to the absorption step and the remainder recycled directly to the alkylation zone. The overhead from the last column which contains the ethyl fluoride in admixture with propane and any lighter gases is treated to condense substantially all of the ethyl fluoride content together with any hydrocarbon desired. The condensate is passed to the hydrolysis step wherein the ethyl fluoride is converted in any suitable way to ethyl alcohol which is recovered in any appropriate manner.

Hydrolysis of ethyl esters

The hydrolysis of the ethyl ester of the alkylation acid is accomplished in any suitable manner and does not per se constitute my invention. Methods of hydrolyzing ethyl esters of sulfuric acid to ethanol are well known in the art.

When sulfuric acid is used as the alkylation acid, the hydrolysis may be accomplished in any suitable manner as for example by the simple addition of an appropriate amount of water in the form of steam or liquid water to the withdrawn acid phase followed by separation of the ethyl alcohol formed. For example the acid phase may be diluted to a strength of 35% sulfuric acid by adding water at 90–100° C. and running the mixture quickly into a flash zone maintained at 110–120° C. by steam jacketing whereby the alcohol is rapidly flashed off and is recovered from the resulting vapors in any manner. Any ether which is formed is vaporized with the alcohol and separated therefrom in any suitable way. In some cases hydrolysis of the ethyl esters may require digestion, with steam stripping to convert them to alcohol. The usual procedure is to agitate the diluted acid mixture in a vessel with steam stripping or to introduce dilute acid into the top of a tower countercurrent to steam stripping.

Where hydrofluoric acid is used as the alkylation catalyst and ethylene esterification agent, the ethyl fluoride-containing material may be treated in accordance with the principles set forth in the copending applications of F. E. Frey, Ser. No. 521,833, filed Feb. 10, 1944, now U. S. Patent 2,484,702, and 559,115, filed Oct. 17, 1944, now U. S. Patent 2,457,882. As is pointed out in said applications, the presence of some free HF in addition to the hydrating agent (water) is desirable in the hydrolysis of the ethyl fluoride. The hydrolysis mixture is then treated in any suitable manner, conveniently in the manner set forth in said copending applications, to recover the alcohol.

Embodiment using sulfuric acid

A specific embodiment of the present invention is illustrated by the flow diagram of Fig. 1 wherein sulfuric acid is employed as the combination alkylation catalyst and olefin absorption reagent. Gases from a cracking operation, which have been freed from substantially all normally liquid components by conventional means, are fed via line 1 to an absorber 2 in which refrigerated (liquid) isobutane fed via line 3 is employed as the absorption fluid. In this step pressures in the general range of 300–1000 p. s. i. are maintained to insure absorption of substantially all $C_2$ and heavier constituents with negligible absorption of light components such as methane, hydrogen, carbon dioxide, etc. Temperatures sufficiently low, are maintained at the top of the absorption tower so that loss of isobutane in the light gas effluent leaving via line 4 is negligible. Some reboiling heat is supplied to the bottom of the column by reboiler 5 in order that virtually no gases lighter than $C_2$ remain in the isobutane stream. If desired, the top of the absorber may be refluxed in any suitable way, as indicated diagrammatically by coil 6; for example, the overhead gases may be dephlegmated or partially condensed in any known way to liquefy substantially all the $C_4$ and heavier, or more preferably the $C_3$ and heavier, or in extreme cases where the refrigeration requirements are not deemed prohibitive, the $C_2$ and heavier, the resulting liquid condensate being introduced into the top of the absorber 2 as liquid reflux. In such case the absorber 2 is performing essentially extractive distillation with liquid isobutane as the solvent and the feed to the absorber may well be at more nearly the mid-point than indicated in the drawing.

The ethylene-rich isobutane stream leaving absorber 2 is fed via line 7 to a typical alkylation reactor 8 operating at temperatures somewhat higher than is considered normal for alkylation. Under such temperature conditions and under sufficient total pressure to provide liquid-liquid contacting, the ethylene reacts to form esters of sulfuric acid while the heavier olefins enter into an alkylation reaction with the isobutane. The total effluent from the reactor which comprises an emulsion of the acid phase and hydrocarbon is passed via line 9 to a settler 10 where a separation of acid and hydrocarbon phases is effected. The hydrocarbon phase is depropanized in column 11 and debutanized in column 12 in a conventional manner to produce alkylate and an isobutane recycle stream withdrawn via lines 13 and 14, respectively.

The alkylation acid phase is withdrawn from the bottom of the settler 10 and in part recycled to reactor 8, the remainder being subjected to hydrolysis in unit 15 to produce ethyl alcohol which is recovered in known manner. Dilution of the acid in the course of hydrolysis will produce heavy hydrocarbons which can be conveniently separated and discarded as indicated by line 16. The dilute acid may be reconcentrated in unit 17 and may be fortified by any convenient manner, as by adding strong makeup acid via line 18, prior to being returned to the alkylation system.

If desired a portion of the isobutane in line 3 may be by-passed around the absorber 2 by means of line 3A directly into the line 7 carrying the feed into the alkylation unit 8.

Embodiment using HF

A second embodiment of this process is illustrated in the flow diagram of Fig. 2 wherein HF is employed as the alkylation acid. The absorption of ethylene and heavier gases in isobutane is carried out in the manner previously described. The ethylene-rich stream is passed via line 7 to an alkylation reactor 20 utilizing concentrated hydrofluoric acid as the catalyst. By-pass line 3A is provided as in Fig. 1. The alkylation effluent is passed via line 21 to settler 22. The hydrocarbon phase from the settler 22 is passed to a fractionation tower 23 where dissolved HF is removed overhead in the form of a butane azeotrope which is condensed and returned via line 30 to the alkylation reactor. The azeo-tower kettle product is debutanized in column 24 to produce alkylate as bottoms product and a butane-and-lighter overhead product. This latter stream is depropanized in column 25 thus producing an isobutane recycle stream which is recycled via line 26 and an overhead product containing all lighter-than-butane components withdrawn via line 27.

At the higher-than-normal temperature prevailing in the alkylation zone, the ethylene reacts with HF to form ethyl fluoride. Since ethyl fluoride boils about 8° F. higher than propane and about 25° F. lower than isobutane it will be recovered in the overhead of depropanizer 25. This stream is sent via line 27 to a hydrolysis reactor 28 where the ethyl fluoride is converted to ethyl alcohol and dilute HF. The alcohol is separated by distillation in known manner and the dilute HF is concentrated in unit 29 before being returned to the alkylation system.

The HF acid phase separated in settler 22 is handled in the conventional manner employed in HF alkylation, a part being recycled directly via line 31 to the alkylation reactor 20 and the balance being passed via line 32 to a re-run unit such as fractionation column 33 where the HF is recovered in substantially pure form in known manner for recycle to the reactor 20, a heavy fraction of tarry material and acid-soluble oil being discarded via line 34. Makeup acid is added as needed via line 35.

This application is directed to an improvement in the invention described and claimed in the co-pending application of P. M. Arnold, Serial No. 615,037, filed Sept. 7, 1945, which discloses and claims the broad conception of converting ethylene in a stream containing same and higher olefins to ethyl alcohol and causing the higher olefins to alkylate an isoparaffin by using an acid which combines with the ethylene forming ethyl esters and which has the property of selectively catalyzing the alkylation of isoparaffins with olefins higher than ethylene but is inactive toward alkylation of isoparaffins with ethylene whether present as such or in the form of ethyl esters of said acid, and subsequently hydrolyzing the ethyl ester of said acid to ethyl alcohol. Within the broad idea the reaction of the ethylene with the acid to form the ethyl ester and the alkylation of the isoparaffin with the higher olefins may take place in the same or in separate zones.

I claim:

1. The process of converting ethylene in gaseous mixtures containing same together with at least one higher aliphatic olefin and at least one gaseous component lighter than ethylene to ethyl alcohol and concomitantly causing said higher olefin to alkylate an alkylatable isoparaffin hydrocarbon which comprises absorbing said gaseous mixture in a molar excess of said isoparaffin hydrocarbon as an absorption liquid and thereby dissolving the olefin content thereof while allowing the lighter content thereof to pass through undissolved, maintaining a concentration of said higher aliphatic olefin such that it will alkylate the isoparaffin preferentially in respect of the ethylene, feeding the resulting solution of olefins and isoparaffin hydrocarbon to an alkylation zone and there contacting said solution of olefins and isoparaffin with a mineral acid alkylation catalyst at an elevated temperature and thereby alkylating said isoparaffin with the olefins higher than ethylene and simultaneously causing the ethylene to form an ethyl ester with said acid catalyst, and hydrolyzing said ethyl ester to ethyl alcohol.

2. The process of converting ethylene in gaseous mixtures containing same together with higher aliphatic olefins and methane and hydrogen to ethyl alcohol and concomitantly causing said higher olefins to alkylate an alkylatable isoparaffin hydrocarbon which comprises absorbing said gaseous mixture in a molar excess of said isoparaffin hydrocarbon as an absorption liquid and thereby dissolving the olefin content thereof while allowing the methane and hydrogen to pass through undissolved, maintaining a concentration of said higher aliphatic olefins such that they will alkylate the isoparaffin preferentially in respect of the ethylene, feeding the resulting solution of olefins and isoparaffin hydrocarbon to an alkylation zone and there contacting said solution of olefins and isoparaffin with a mineral acid alkylation catalyst at an elevated temperature and thereby alkylating said isoparaffin with the olefins higher than ethylene and simultaneously causing the ethylene to form an ethyl ester with said acid catalyst, withdrawing the effluent from said alkylation zone, separately recovering from said effluent the alkylate contained therein and a fraction containing said ethyl ester, and hydrolyzing said ethyl ester to yield ethyl alcohol.

3. The process of claim 2 wherein said withdrawn alkylation effluent is allowed to separate into two liquid layers, namely, an acid layer and a hydrocarbon layer, said acid layer containing the bulk of said ethyl ester and the hydrocarbon layer containing said alkylate, said layers are separately withdrawn, said alkylate is recovered from said hydrocarbon layer, water is added to at least a portion of said acid layer under conditions such as to effect hydrolysis of said ethyl ester to ethyl alcohol and said ethyl alcohol is recovered from the hydrolysis mixture.

4. The process of claim 2 wherein said acid catalyst is sulfuric acid of at least 90 per cent strength, said withdrawn alkylation effluent is allowed to separate into two liquid layers, namely, an acid layer and a hydrocarbon layer, said acid layer containing the bulk of said ethyl ester and the hydrocarbon layer containing said alkylate, said layers are separately withdrawn, said alkylate is recovered from said hydrocarbon layer, a portion of said acid layer is recycled directly to the alkylation zone, water is added to another portion of said acid layer under conditions such as to effect hydrolysis of said ethyl ester to ethyl alcohol, and said ethyl alcohol is recovered from the hydrolysis mixture.

5. The process of claim 2 wherein said withdrawn alkylation effluent is allowed to separate into two liquid layers, namely, an acid layer and a hydrocarbon layer, said hydrocarbon layer containing said alkylate and the bulk of said ethyl ester, said acid layer is recycled to said alkylation zone, a portion thereof being re-run as necessary, said alkylate is recovered from said hydrocarbon layer leaving a fraction containing said ethyl ester, water is added to said fraction containing said ethyl ester under conditions such as to effect hydrolysis of said ethyl ester and said ethyl alcohol is recovered from the hydrolysis mixture.

6. The process of claim 2 wherein said acid catalyst is substantially anhydrous hydrofluoric acid, said withdrawn alkylation effluent is allowed to separate into two liquid layers, namely, a hydrofluoric acid layer and a hydrocarbon layer, said hydrocarbon layer containing said alkylate and the bulk of said ethyl ester which is in the form of ethyl fluoride, said acid layer is recycled to said alkylation zone, a portion thereof being re-run as necessary, said hydrocarbon layer is fractionally distilled to recover overhead an azeotrope of hydrogen fluoride and isoparaffin, which is recycled to said alkylation zone, the resulting bottoms product being fractionally distilled to recover said alkylate as a bottoms product, the overhead from said last-named distilling step is fractionally distilled to recover a bottoms fraction of isoparaffin which is recycled to the absorption step, the overhead from the last-named distilling step which contains said ethyl fluoride is condensed and water is added to the condensate under conditions such as to effect hydrolysis of said ethyl fluoride to ethyl alcohol, and said ethyl alcohol is recovered from the hydrolysis mixture.

7. The process of claim 1 wherein said isoparaffin hydrocarbon is isobutane.

8. The process of claim 2 wherein said isoparaffin is isobutane.

9. The process of claim 2 wherein said alkylation is conducted at a temperature of at least 120° F. and at a pressure such as to maintain liquid phase in order to facilitate conversion of said ethylene to said ethyl ester.

10. The process of claim 2 wherein said catalyst is concentrated sulfuric acid of at least 90 per cent strength and wherein said alkylation is conducted at a temperature of at least 120° F. and at a pressure such as to maintain liquid phase in order to facilitate conversion of said ethylene to the ethyl ester of sulfuric acid.

11. The process of claim 2 wherein said catalyst is substantially anhydrous hydrofluoric acid and wherein said alkylation is conducted at a temperature of at least 180° F. and at a pressure such as to maintain liquid phase in order to facilitate conversion of said ethylene to ethyl fluoride.

12. The process of claim 2 wherein said isoparaffin is fed into the absorption zone at a rate such as to maintain an isoparaffin-olefin molar ratio in the alkylation zone of at least 5:1 whereby absorption is facilitated and undesirable side reactions during the alkylation are minimized.

13. The process of claim 2 wherein the absorption step is an extractive distillation, the olefin-containing feed being introduced at an intermediate point, the overhead from the absorber being condensed to liquefy substantially all the $C_4$ and heavier content thereof, the top of the absorber being refluxed with the resulting condensate, and the bottom of said absorber is reboiled so that substantially no gases lighter than $C_2$ remain in the withdrawn bottoms product.

14. The process of claim 2 wherein said alkylation catalyst is sulfuric acid of at least 90 per cent strength and wherein substantially all the unconverted isoparaffin appearing in the alkylation effluent is recovered therefrom and is recycled in liquid form to the top of the absorption zone.

15. The process of claim 2 wherein said alkylation catalyst is substantially anhydrous hydrofluoric acid and wherein a portion of the unconverted isoparaffin appearing in the alkylation effluent is recovered therefrom in the form of an azeotrope with hydrofluoric acid, said azeotrope is recycled to the alkylation zone, and wherein substantially all of the balance of said unconverted isoparaffin is recovered therefrom and is recycled in liquid form to the top of the absorption zone.

16. A process for the simultaneous production of ethyl alcohol and alkylate of aliphatic olefins higher than ethylene with isobutane from a feed consisting of cracked gas containing hydrogen, methane, ethylene and aliphatic olefins higher than ethylene and a feed consisting of isobutane, the ethylene being converted substantially completely to ethyl alcohol and the higher olefins being converted substantially completely to alkylate, which comprises subjecting said cracked gas to absorption by countercurrent contact with said liquid isobutane at a pressure of from 600 to 1000 pounds per square inch gage and with a molar ratio of said isobutane to olefin in said cracked gas of at least 5:1 under such conditions that substantially all of the $C_2$ and heavier components of said cracked gas are absorbed in said isobutane while said hydrogen and methane are substantially completely undissolved, maintaining a concentration of said higher aliphatic olefins such that they will alkylate the isoparaffin preferentially in respect of the ethylene, passing the rich absorption liquid comprising liquid isobutane containing in solution the ethylene and higher olefins contained in said cracked gas to an alkylation step, in said alkylation step intimately contacting said rich absorption liquid with substantially anhydrous liquid hydrofluoric acid at a temperature of at least 180° F. and under a pressure sufficient to maintain liquid phase and thereby effecting alkylation of the isobutane with substantially all of the olefin higher than ethylene to the substantial exclusion of alkylation of ethylene and reaction of substantially all of the ethylene with the hydrofluoric acid to form ethyl fluoride to the substantial exclusion of formation of hydrofluoric acid esters of the olefins higher than ethylene, passing the resulting alkylation effluent comprising an emulsion of hydrofluoric acid and hydrocarbon phases to a separation zone and there allowing it to separate into an acid phase and a hydrocarbon phase containing substantially all of the alkylate and the bulk of the ethyl fluoride, recycling the acid phase to the alkylation zone, fractionally distilling the hydrocarbon phase to take overhead an azeotrope of hydrogen fluoride and hydrocarbon, recycling said overhead to the alkylation zone, debutanizing the resulting kettle product to form a kettle product containing the alkylate and an overhead product of isobutane and lighter, fractionally distilling said overhead to separate same into a kettle product of isobutane and an overhead product containing the ethyl fluoride, recycling said kettle product of isobutane to the absorption step, condensing said overhead product containing the ethyl fluoride, hydrolyzing said ethyl fluoride with water and free hydrogen fluoride to form ethyl alcohol, and recovering said ethyl alcohol from the hydrolysis mixture.

17. A process for the simultaneous production of ethyl alcohol and alkylate of aliphatic olefins higher than ethylene with isobutane from a feed consisting of cracked gas containing hydrogen, methane, ethylene and aliphatic olefins higher than ethylene and a feed consisting of isobutane, the ethylene being converted substantially completely to ethyl alcohol and the higher olefins being converted substantially completely to alkylate, which comprises subjecting said cracked gas to absorption in an absorption zone by countercurrent contact with said liquid isobutane at a pressure of from 600 to 1000 pounds per square inch gage and with a molar ratio of said isobutane to olefin in said cracked gas of at least 5:1 under such conditions that substantially all of the $C_2$ and heavier components of said cracked gas are absorbed in said isobutane while said hydrogen and methane are substantially completely undissolved, maintaining a concentration of said higher aliphatic olefins such that they will alkylate the isoparaffin preferentially in respect of the ethylene, passing the rich absorption liquid comprising liquid isobutane containing in solution the ethylene and higher olefins contained in said cracked gas to an alkylation step, in said alkylation step intimately contacting said large absorption liquid with sulfuric acid at a temperature of at least 120° F., and under a pressure sufficient to maintain liquid phase and thereby effecting alkylation of the isobutane with substantially all of the olefin higher than ethylene to the substantial exclusion of alkylation of ethylene and reaction of substantially all of the ethylene with the sulfuric acid to form ethyl esters of sulfuric acid to the substantial exclusion of formation of sulfuric acid esters of the olefins higher than ethylene, passing the resulting alkylation effluent comprising an emulsion of sulfuric acid and hydrocarbon phases into a separation zone and there allowing it to separate into an acid phase and a hydrocarbon phase said acid phase containing the bulk of said ethyl esters and the said hydrocarbon phase containing said alkylate, separately withdrawing said phases, recovering said alkylate from said hydrocarbon phase, recovering unconverted isobutane from said hydrocarbon phase, recycling said isobutane to said absorption zone, recycling a portion of said acid phase directly to the alkylation zone, adding water to another portion of said acid phase under conditions such as to effect hydrolysis of said ethyl esters to ethyl alcohol and recovering said ethyl alcohol from the hydrolysis mixture.

WILLIAM WHITNEY WEINRICH.

REFERENCES CITED

The following references are of record in the file of this patent:

UNITED STATES PATENTS

| Number | Name | Date |
|---|---|---|
| 1,365,048 | Ellis | Jan. 11, 1921 |
| 1,486,646 | Ellis | Mar. 11, 1924 |
| 1,859,241 | Merley | May 17, 1932 |
| 2,014,740 | Larson | Sept. 17, 1935 |
| 2,135,455 | Loder | Nov. 1, 1938 |
| 2,351,464 | Voorhies | June 13, 1944 |
| 2,354,595 | Hopper | July 25, 1944 |
| 2,385,123 | Atkins | Sept. 18, 1945 |
| 2,404,879 | Axe | July 30, 1946 |